United States Patent [19]

Desbos

[11] Patent Number: 4,800,021

[45] Date of Patent: Jan. 24, 1989

[54] PROCESS FOR BIOLOGICALLY PURIFYING SEWAGE ON A BED OF GRANULAR MATERIAL

[75] Inventor: Gilbert Desbos, Maisons-Laffitte, France

[73] Assignee: OTV (Omnium de Traitements et de Valorisation), Courbevoie, France

[21] Appl. No.: 100,972

[22] Filed: Sep. 25, 1987

[30] Foreign Application Priority Data

Oct. 1, 1986 [FR] France ................................ 86 13675

[51] Int. Cl.[4] ............................................. C02F 3/30
[52] U.S. Cl. .................................... 210/605; 210/618; 210/150
[58] Field of Search ............... 210/603, 617, 605, 618, 210/150, 151, 631, 906

[56] References Cited

U.S. PATENT DOCUMENTS

| | | | |
|---|---|---|---|
| 3,126,333 | 3/1964 | Williams | 210/617 |
| 3,171,802 | 3/1965 | Rice et al. | 210/631 |
| 3,968,034 | 7/1976 | Tymoszczuk | 210/618 |
| 4,253,947 | 3/1981 | Fan et al. | 210/618 |
| 4,521,311 | 6/1985 | Fuchs et al. | 210/618 |
| 4,560,479 | 12/1985 | Heijnen | 210/617 |
| 4,696,747 | 9/1987 | Verstraete et al. | 210/605 |

FOREIGN PATENT DOCUMENTS

| | | | |
|---|---|---|---|
| 59-23878 | 6/1984 | Japan | 210/617 |
| 61-13859 | 6/1986 | Japan | 210/617 |

*Primary Examiner*—Benoit Castel
*Attorney, Agent, or Firm*—Browdy & Neimark

[57] ABSTRACT

Water is purified according to the principle of a biomass fixed on an aerated granular bed acting as a filter in a biological reactor.

The water to be purified is sent, without presettling, upwardly through a multilayer granular bed placed in the reactor. The injection point of oxygenated gas determines two succesive zones, anaerobic and then aerobic. The water is evacuated from the reactor at the top thereof, or at a certain level of the bed. A sudden downward flushing of the filter with water is provided to eliminate the biomass. The filter is periodically washed with air/water and then rinsed with water.

5 Claims, 1 Drawing Sheet

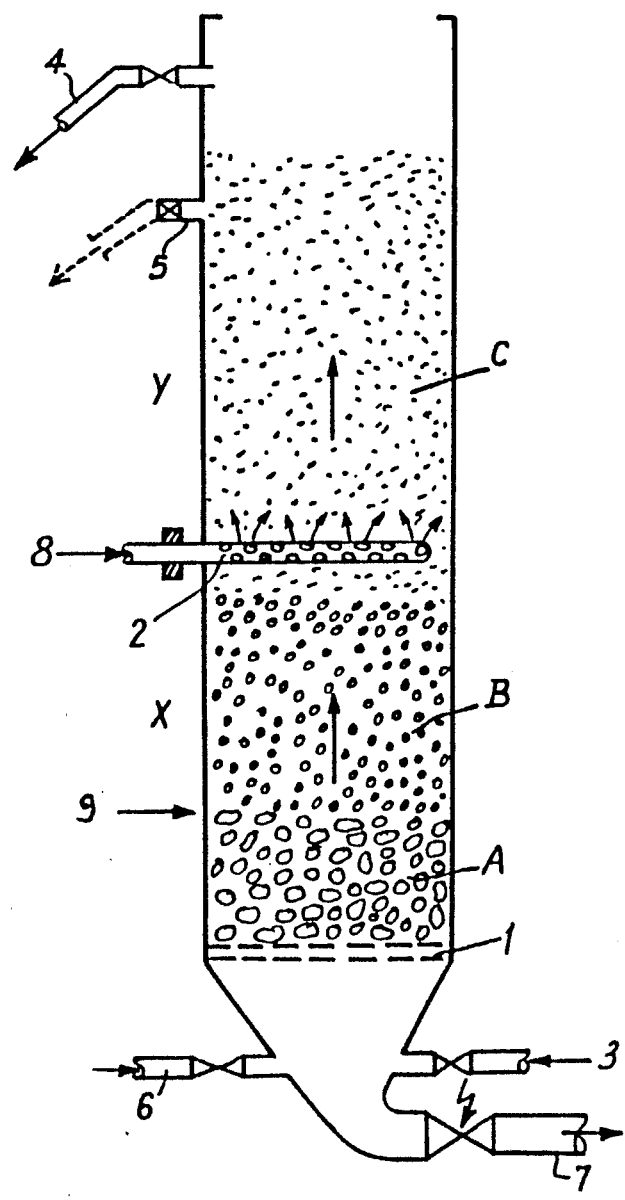

PROCESS FOR BIOLOGICALLY PURIFYING SEWAGE ON A BED OF GRANULAR MATERIAL

FIELD OF THE INVENTION

The present invention relates to the field of biologically purifying sewage such as especially city sewage, industrial sewage and, possibly tap water to be made potable.

BACKGROUND OF THE INVENTION

It is known that biological treatment, for example of water, consists of degrading the organic impurities by the action of a free or fixed purifying biomass containing various microorganisms: bacteria, yeasts, protozoa, metazoa, etc. . . In the free biomass process, by activated sludge, it is impossible to concentrate the various species of microorganisms in large numbers, and it is not very easy to settle if the concentration of the biomass is achieved by settling. The process therefore is limited with regard to the applicable BOD (biological oxygen demand) and COD (chemical oxygen demand) load. In the fixed biomass system, the concentration of biomass (with the bacteria) is performed by hooking onto a support. Aptitude for settling then is no longer a primordial criterion and this technique has a purifying potential quite superior to that of standard processes.

The present invention is in the field of fixed biomass biological purification, advantageously with a fixed granular bed in a biological reactor thus playing a filtration role to retain the excess sludge produced inside the reactor as well as the suspension materials present in the effluent to be treated. The reactor is washed periodically to eliminate the excess sludge and materials in suspension that accumulate.

Of the most high-performance processes, based on this principle of fixed biomass purification, there will be recalled here the process known as "Biocarbone" (registered trademark) developed by the present applicant and which essentially comprises the water to be treated to percolate downward through a submerged, fixed bed of granular filtering material while blowing in an oxygenated gas current at an intermediate level of the bed, under well-determined, critical conditions of water flow, oxygenated gas flow, nature and constitution of the bed, amount of pollution to be eliminated. . . etc. (see, for example, French Pat. Nos. 76.21246 publ. 2 358 362 and 78.30282 publ. 2 439 749; as well as their corresponding foreign patents.

SUMMARY OF THE INVENTION

One of the objects of the present invention aims at the development of a process, inspired by the above-mentioned technique of aerated filter in the granular mass, which can treat directly, after a simple screening of raw sewage, without the necessity of the preliminary operation of presettling.

Another object of the present invention relates to the achievement of savings in aeration oxygenated gas and in the volume of water necessary for washing the filter, while maintaining the possibility of treating, with great efficiency, water containing large pollution loads, for example, at least 15 kg of $COD/M^3$ of bed/day.

According to the basic characteristic of the process according to the invention, the purification treatment is performed in a single reactor where the water to be treated goes upward through the mass of granular material (of filtering bed) through to two successive areas, namely, an anaerobic, then a second, aerobic type, zone, where oxygenated gas for aeration is injected.

In the following description, by "anaerobic" zone is understood an area devoid of free oxygen and which will be fed by a water effluent to be treated, devoid of nitrate, this zone being able to be called "acidogenic" when the hydrocarbon molecules contained in the affluent are transformed into fatty acids.

When the prior art is examined closely, descriptions of processes are certainly found in which a variety of techniques are used, often as variants, such as: rising injection of water ascending in one or more fixed beds, introduction of air at several points of the bed, use of an anaerobic zone for filtration, etc. In no case, however, is a technique suggested or described combining the parameters and critical operating phases as they are envisaged in the present invention.

According to an advantageous embodiment of the general process, as defined above, the bed of granular material is of the multilayer type whose grain sizes decrease upward. For example, by way of nonlimiting preference, the filtering material can comprise, upwardly: a first layer of a grain size of 20 to 60 mm (for example, pebbles) over a height of at least 15 cm; a second layer of a grain size of 6 to 10 mm over a height of at least 40 cm, then an upper layer of a grain size of 1 to 4 mm over a height of at least 50 cm. Besides said support of pebbles (or the like), the filtering product can consist, for example, of one of the following products or their mixture: schists, clays, activated carbon, sand, expanded plastic materials, the densities of these products (or a part of them) being able to be greater or less than that of the water.

In practice, the average heights of these layers, for example three are used as above, vary most often: between 25 and 40 cm for the lower layer, between 65 and 85 cm for the intermediate layer and between 60 cm and 2 m for the fine upper layer, for a reactor of about 3.5 m.

In the gradation of the diameters of particles, as defined above, and generally for the good progress of the process, the interstices of the grains selected for the lower layers avoid the penetration of grains of the upper layer. During fixed bed purification, therefore no mixing of the layers of granular materials occurs and thus it is possible, according to an essential object of the invention, to maintain two superposed biological populations whose different effects, respectively characterized by an aerobic medium and anaerobic medium, then become complementary in the matter of purification.

Thanks to the prefiltration, according to the invention, in the low anaerobic zone, also called acidogenic zone, where complex organic materials of the raw water are transformed into volatile fatty acids, a series of advantages are obtained particularly appreciable saving in the oxygen input necessary for aerated filtration in the anaerobic upper zone where the purification is completed;

a considerable reduction of the original COD, which can amount of 40 to 50% (by weight) as well as a good retention of the materials in suspension;

biological oxidation kinetics, in the aerated filtration zone, considerably faster, because of the previous transformation of organic pollutants in the acidogenic zone; hence the possibility, as previously mentioned, of admitting very great applied COD loads, for example up to 30 kg/m³ of bed/day, thanks to the superposition in a single structure, according to the invention, of two successive biological filtrations in two quite distinct zones.

It will be noted, in this regard, that the final phase of methanization (transformation of fatty acids into methane) by methanogenic bacteria, standard in simple anaerobic treatment, is replaced here, partially or wholly, by an anaerobic purification and transformation of fatty acids and simpler organic molecules into $CO_2$.

According to the invention, the oxygenated gas, as, for example, optionally air enriched with oxygen, is injected at the level that has been selected as the upper limit of the anaerobic zone. In practice, in the above-mentioned case of multilayer bed, the injection point can correspond approximately to the lower third or to half of the total height of the granular bed.

This air, whose speed is generally kept between 5 and 40 m/h when the current of gaseous fluid is continuous, can, on the one hand, be distributed at several points in the aerobic upper zone and, on the one hand, be injected intermittently, depending on the rates selected by one skilled in the art as a function of the amount of pollution of the water to be treated. In practice, the amounts of air generally vary between 10 and 40 $Nm^3/h/kg$ of applied BOD. Moreover, according to a variant that can be used within the framework of the process of the invention, it is possible intermittently to send oxygenated gas, just before the purge evacuating the excess biomass at the bottom of the filter to reduce, if desired, the level of phosphorus in the treated effluent.

The water treated according to the invention is normally evacuated by overflow at the top of the reactor. However, it is also possible to withdraw it, at least in part, slightly below the upper lever of the filtering bed.

Washing of the filters is generally performed by simultaneously washing with air and water (at speeds of 25 to 100 m/h) then rinsing with water alone at a speed of 20 to 120 m/h. Further, it is essential during treatment to eliminate in part the biomass retained in the lower layers of the filter by programmed flushings, downward, by means of the water contained in the filtering bed to keep the amount of active biomass optimal in the filter as a function of the pollution contained in the effluent to be treated.

In certain cases, it can be advantageous to add a small amount of coagulating agent to the raw water before its ascending introduction into the two filtering zones. It is also possible to use any of the known coagulating agents such as alumina sulfate, ferric salt, organic polymers, etc.

BRIEF DESCRIPTION OF THE DRAWING

The FIGURE illustrates an apparatus suitable for carrying out the invention.

DETAILED DESCRIPTION OF THE INVENTION

Other details and operating parameters will come out in the following description, relative to nonlimiting examples of embodiment and illustration of a device for use.

EXAMPLES

For the numerous tests, of which some illustrative ones are described below, a tubular-shaped pilot reactor with a diameter of 45 cm and height of about 3.60 m was used, whose simplified diagram is represented in FIG. 1 (single FIGURE) attached.

The granular filtration bed was made up successively, upward, above grill-support 1: a first layer A of pebbles of 30 to 40 mm in diameter and of about 30 cm in height; a second layer B of gravel 6 to 8 mm in diameter and about 70 cm in height; a third layer C of expanded schist with a diameter of grains of 2 to 5 mm and a height of about 1 m.

The oxygenated gas, in this case air, was sent by perforated racket 2 at a level determined as the upper limit of anaerobic zone X, aerobic zone Y being understood as located above racket 2. In the present case, the injection of air was performed to about 1 meter from bottom 1 of the reactor, in the lower part of the third granular layer C.

The water effluent to be treated was introduced upward in the reactor by pipe 3; the purified water was evacuated by overflow at 4 in the top of the reactor or, according to a variant, by pipe 5 located just below the upper lever of schist layer 5. The filter washing water was sent by pipe 6, while pipe 7 shows evacuation of the periodic upward water flushings of the filter by the water contained in the latter to eliminate the biomass partially.

(A) According to a first series of tests, city sewage (effluent arriving by 3), after screening and grit removal, with characteristics:

COD: 550 to 650 mg/l
BOD: 200 to 250 mg/l
MES: 250 to 350 mg/l (materials in suspension)

The general operating conditions were the following:
speed of ascending waters to be treated: 2 m/h
speed of injected air at 8: 6 to 9 m/h
applied load 14 kg $COD/m^3$ of material/day
water flushing (purging) of the filter for 4 to 5 seconds downward, about every 6 hours, which corresponded to about 1% of the production of purified water;
ascending washing of the filter every 48 hours with air speed of 40 m/h and water speed of 80 m/h approximately, then rinsing with water at about 80 m/h, the total period of washings and rinsings being about 10 minutes.

Such a treatment of raw water, according to the process of the invention, made it possible to obtain purified water whose COD had fallen to 80 mg/l while the MES dropped to 25 mg/l.

As a variant, during several tests, a second air racket was introduced at the level indicated by arrow 9 and it was found that, in certain cases, slightly better results were obtained.

By way of illustration, there are indicated in table 1 below the effects obtained in a single anaerobic zone X during treatments performed as indicated above; in this table, all the indicated figures correspond to mg/l.

TABLE 1

|  | Raw Water | Water from Anaerobic (or acidogenic) zone |
|---|---|---|
| Total COD | 550 | 330 |
| Dissolved COD | 280 | 230 |
| MES | 260 | 90 |
| N (from $NH_3$) | 42 | 45 |
| Total P | 11 | 10.8 |
| Orthophosphates | 8.5 | 12.9 |
| Volatile fatty acids | 12 | 55 |

As can be seen from the above, in the anaerobic zone and without expenditure of aeration energy, there is already retained about 40% of the COD, and about 65% of the MES (a presettling by eliminating 50% at most). Further, ammonia increases slightly by mineralization of the organic nitrogen, the orthophosphate part of the total phosphorus increased; and, especially, a large part of the organic pollution was transformed into volatile fatty acids.

(B) According to another series of tests, the object was the treatment also of the nitrogen of ammonia by simple nitrification of the $NH_3$.

The operation was in the reactor illustrated, with the same type of granular bed but with a bed height of 3 m (instead of 2 m as above) whose third fine layer was 2 m instead of 1 m. The general conditions were the same as for example 1 but with the following data:

in the raw water: COD: 600 mg/l N (from $NH_3$: 30 mg/l
applied load in COD: 10 kg/m³ of bed/day
load in N from $NH_3$: 0.48 kg/m³ of bed/day
speed of ascending raw water: 2 m/h
speed of racket air (2): 17 m/h The treated water presented the following characteristics:

COD: 60 mg/l
N (from $NH_3$): 5 mg/l
N (from $NO_3$): 14 mg/l

What is claimed is:

1. In a process for biologically purifying sewage with a biomass in a fixed multilayer bed of granular materials with at least partial aeration of the biomass and where the sewage to be treated flows upwardly in said bed, the improvement comprising using a single filtration reactor including a lower anaerobic zone and an upper aerobic zone, said zones being materially separated by an injection of oxygenated gas, said filtration reactor including, in an upward direction: a first layer having a grain size of between about 20 mm and about 60 mm over a height of at least 15 cm; a second layer having a grain size of between 6 mm and about 10 mm over a height of at least 40 cm; and an upper layer having a grain size of from about 21 mm to about 4 mm over a height of at least 50 cm; said injection of oxygenated gas being made in the lower part of the said upper layer.

2. The process of claim 1 wherein, during treatment, excess biomass is eliminated by sudden downward flushings of water contained in the filtering bed so as to obtain an optimal ratio between entering pollution and the biomass.

3. The process of claim 1 wherein the oxygenated gas is sent intermittently into the bottom of the filter to reduce the level of phosphorus of the treated effluent.

4. The process of claim 1 wherein a coagulating agent is added to the water to be treated prior to ascending entry into the reactor.

5. The process of claim 1 wherein washings with currents of air and water at speeds of from 25 to 100 meters/hour and a final rinsing with purified water at a speed of from 20 to 120 meters/hour is performed periodically.

* * * * *